United States Patent [19]

Inoue

[11] Patent Number: 4,678,420
[45] Date of Patent: Jul. 7, 1987

[54] INJECTION MOLDING MACHINE WITH AUXILIARY PACKING MEANS

[75] Inventor: Kiyoshi Inoue, Tokyo, Japan

[73] Assignee: Inoue-Japax Research Incorporated, Kanagawaken, Japan

[21] Appl. No.: 698,419

[22] Filed: Feb. 5, 1985

[30] Foreign Application Priority Data

Feb. 6, 1984 [JP] Japan .................. 59-18488
Oct. 9, 1984 [JP] Japan .................. 59-210378

[51] Int. Cl.⁴ .................. B29C 45/77; B29C 45/78
[52] U.S. Cl. .................. 425/144; 425/145; 425/149; 425/174.2; 425/547; 425/549
[58] Field of Search .......... 425/143, 145, 149, 547, 425/150, 549, 174.2, 144

[56] References Cited

U.S. PATENT DOCUMENTS

| | | | |
|---|---|---|---|
| 2,627,087 | 2/1953 | Hendry | 425/145 |
| 2,875,311 | 2/1959 | Harkenrider | 425/457 |
| 3,191,233 | 6/1965 | Linderoth, Jr. | 425/146 |
| 3,241,192 | 3/1966 | Nouel | 425/145 |
| 3,666,141 | 5/1972 | Ma et al. | 425/145 |
| 3,822,867 | 7/1974 | Evans | 425/144 |
| 3,825,235 | 7/1974 | Schwertfeger et al. | 264/40.7 |
| 3,937,776 | 2/1976 | Hold et al. | 264/40.7 |
| 3,941,534 | 3/1976 | Hunkar | 264/40.7 |
| 4,208,176 | 6/1980 | Salerno | 425/144 |
| 4,311,446 | 1/1982 | Hold et al. | 425/145 |
| 4,550,002 | 10/1985 | Uhland et al. | 425/144 |

FOREIGN PATENT DOCUMENTS 1105151 4/1961 Fed. Rep. of Germany.
1553319 12/1968 France.
2101034A 1/1983 United Kingdom.

Primary Examiner—Jay H. Woo
Attorney, Agent, or Firm—Finnegan, Henderson, Farabow, Garrett & Dunner

[57] ABSTRACT

An injection molding machine or system in which an auxiliary packing stage is provided between a plasticating stage and a molding stage. The packing stage comprises a tubular housing and a ram member disposed for sliding displacement therein by a drive unit. The ram member is reciprocated in the tubular housing to intermittently develop a packing chamber therein to allow an amount of the extruded material from the plasticating stage to be accepted temporarily in the chamber and to intermittently reduce the volume of the chamber to discharge the accepted amount of the melt under pressure into a mold cavity in the molding stage. A control unit acting on the drive unit establishes a predetermined stroke and rate of each displacement or reciprocation of the ram member in conjunction with the volume of the mold cavity and the kind of the material to be molded. The extruded amount of the material is adjusted in conjunction with the volume of the mold cavity.

6 Claims, 4 Drawing Figures

INJECTION MOLDING MACHINE WITH AUXILIARY PACKING MEANS

FIELD OF THE INVENTION

The present invention relates to injection molding of thermoplastic materials and, more particularly, to improvements in injection molding machines and systems which permits qualities and reproducibility of molded products to be markedly improved.

BACKGROUND OF THE INVENTION

Fully automated injection molding machines for producing a number of molded plastic products consecutively from a plastic predecessor have already been developed and put into commercial utility. While these machines minimize the operator's intervention over repetitive molding cycles, the qualities and reproducibility of their molded products remain not entirely satisfactory. Thus, unqualified or defective products unavoidably develop which are most often comparable in proportion with products of a desired quality. The unqualified products are characterized by dimensional inaccuracy and the formation of microvoids and/or internal cracks. It has now been observed that these defects tend to develop a lack of proper control and arrangement in the conventional injection molding system.

OBJECT OF THE INVENTION

Accordingly, the present invention seeks to provide a new and improved injection molding arrangement and control which are capable of improving the quality and reproducibility of molded product of due qualification.

SUMMARY OF THE INVENTION

In accordance with the present invention there is provided an injection molding machine or system which comprises: a feeder for dispensing a plastic predecessor material; a barrel means having a screwed ram rotationally disposed in a heated cylinder for plasticizing the material from the feeder and extruding through an outlet nozzle of the cylinder a melt of the plasticized material to be injected and packed into a mold cavity formed in a destructable molding means; an auxiliary packing means comprising a heated tubular housing disposed between the barrel means and the molding means, a member disposed for sliding displacement by drive means in the tubular housing to develop a packing chamber therein and to allow an amount of the extruded melt from said outlet nozzle to be accepted temporarily in said chamber and to reduce the volume of said chamber to discharge the accepted amount of the melt under pressure into said mold cavity; and control means acting on said drive means to establish a predetermined stroke and rate of each displacement of said member in conjunction with the volume of said mold and the kind of the material to be molded.

BRIEF DESCRIPTION OF THE DRAWINGS

These and other features of the invention as well as advantages thereof will become more readily apparent from the following description when taken with reference to the accompanying drawings in which.

SPECIFIC DESCRIPTION

Figure 1:
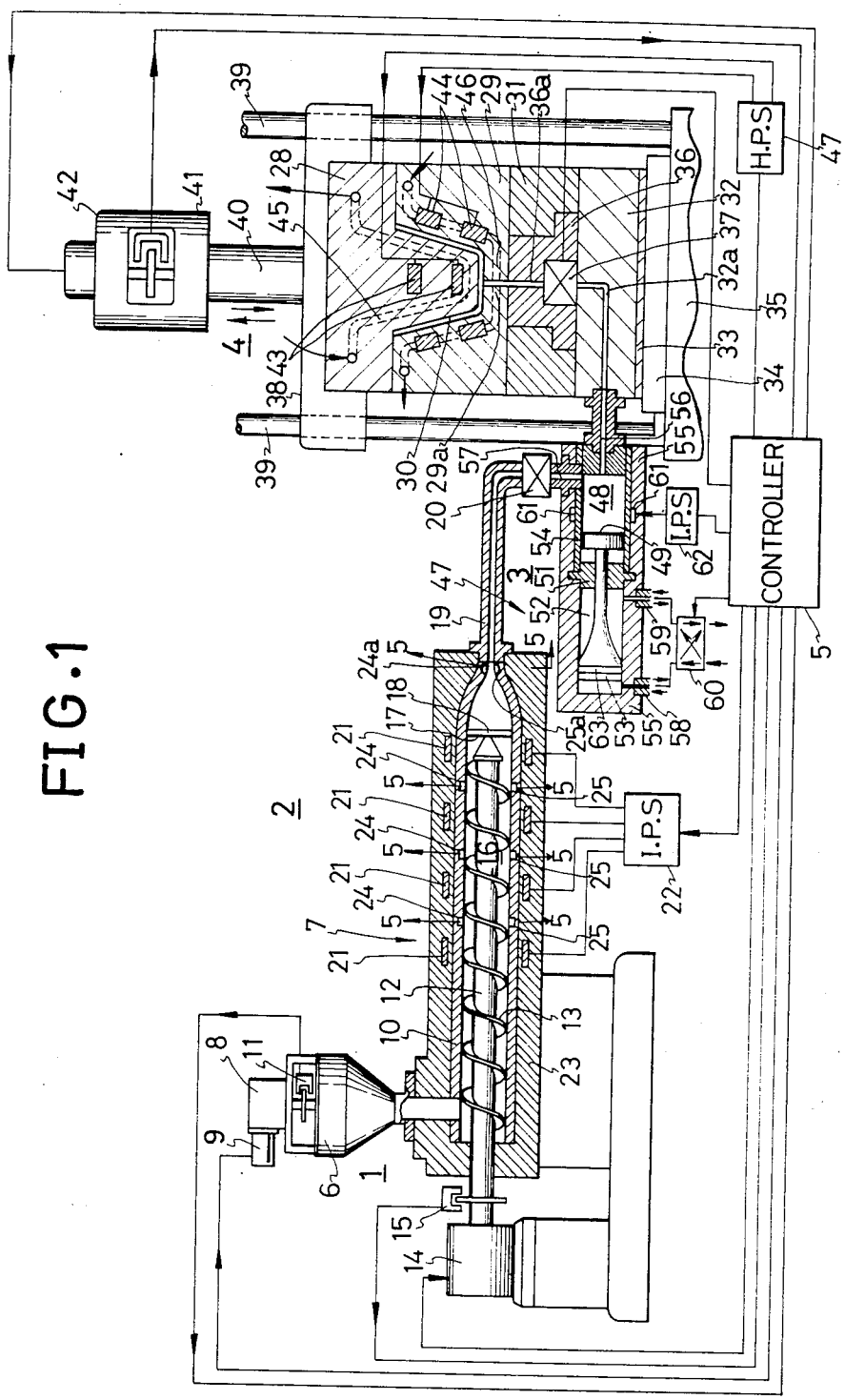
FIG. 1 is a diagrammatic view essentially in section illustrating an improved injection molding machine embodying the present invention.

Referring now to FIG. 1, an injection molding apparatus shown comprises a material feeding stage 1, a plasticating stage 2, an auxiliary stage 3 and a molding stage 4. All operating elements to be described in these stages are designed to be controlled by a controller or computerized numerical control (CNC) unit 5.

The feeding stage 1 comprises a funnel-shaped feeder 6 mounted on a barrel 7 of the plasticating stage 2. The feeder 6 stores a predecessor, e.g. in the form of pellets, of a thermoplastic material, reinforced or unreinforced, to be molded in the molding stage 4. A screwed rotary drive 8 is driven by a motor 9 to pulverize the pellets and feed the pulverized material into a cylinder 10 in the barrel 7. An encoder 11 is associated with the rotary shaft of the feeder drive 8 to provide a feedback signal representing its rotary angle and rate of rotation, eventually a change in the torque encounted thereby in feeding and compacting the material into the plasticating cylinder 10. The sensed signal is fed to and processed in the control unit 5 which applies a resultant control signal to the motor 9 so that the rate at which the material is fed into the plasticating stage 2 remains substantially constant in spite of possible changes in the torque encountered by the rotary drive 8.

In the plasticating stage 2, a longitudinal ram 12 with a screw 13 is rotatably disposed in the cylinder 10 coaxially therewith. The ram 12 in the illustrated arrangement is rotated by a motor 14 disposed outside of the barrel 7. The motor 14 has its output drive shaft secured to the rear end of the ram 12 and having an encoder 15 associated therewith. As the screwed ram 12 is rotated, the material fed from the feeder 1 6 is transferred under pressure into and through a heating zone 16 where it is homogeneously plasticized. A melt of the plasticized material thus formed is driven further by the rotating screw 13 to pass under pressure through a braker plate 17 and a mesh screen 18 for further homogenization and thereafter extruded out of the cylinder 10 through an outlet nozzle or port 19 for entry via a check valve 20 into the packing stage 3.

In the embodiment illustrated, the heating zone 16 in the plasticizing barrel 7 is advantageously established by a plurality of induction coils 21 energized by a high-frequency pulsed or alternating current furnished from an inverter-type power supply 22. The coils or inductors 16 surrounding the cylinder 10 are embedded in an insulating shroud 23 covering the cylinder 10. Alternatively, the coils 16 may be arranged to surround the shroud 18 surrounding the cylinder. In general, when a high-frequency pulsed or alternating current passes through a coil surrounding a conductive cylinder, an eddy current is produced by electromagnetic induction in the cylinder to generate heat wherein due to eddy-current loss. The induced heating current tends to concentrate in a surface layer of the cylinder (i.e. skin effect). The thickness of the layer in which induction heating penetrates varies in inverse proportion to the square of the frequency of the input high-frequency current. Thus, the wall thickness of the cylinder 10 conjunction with the output frequency of the inverter power supply 22 is advantageously made sufficiently thin to provide a highly efficient and rapid-response heat source for the plasticizing material flowing therein. When the heat source for the material is so arranged as described, it has been found that an increase in power efficiency by two or three times over the conventional arrangement in which the cylinder is merely a thermal conductor transmitting heat from an external heat source to the material. Preferably, each of the coils 21 has its own power input which is adjustable independently of the power inputs applied to the other coils. It is further desirable that as the coils 21 in position are closer to the outlet 19, they have higher power inputs so that the material is progressively elevated in temperature and at lower temperature gradients to a maximum, e.g. 170° C., before it is extruded through the outlet 19.

Figure 2:
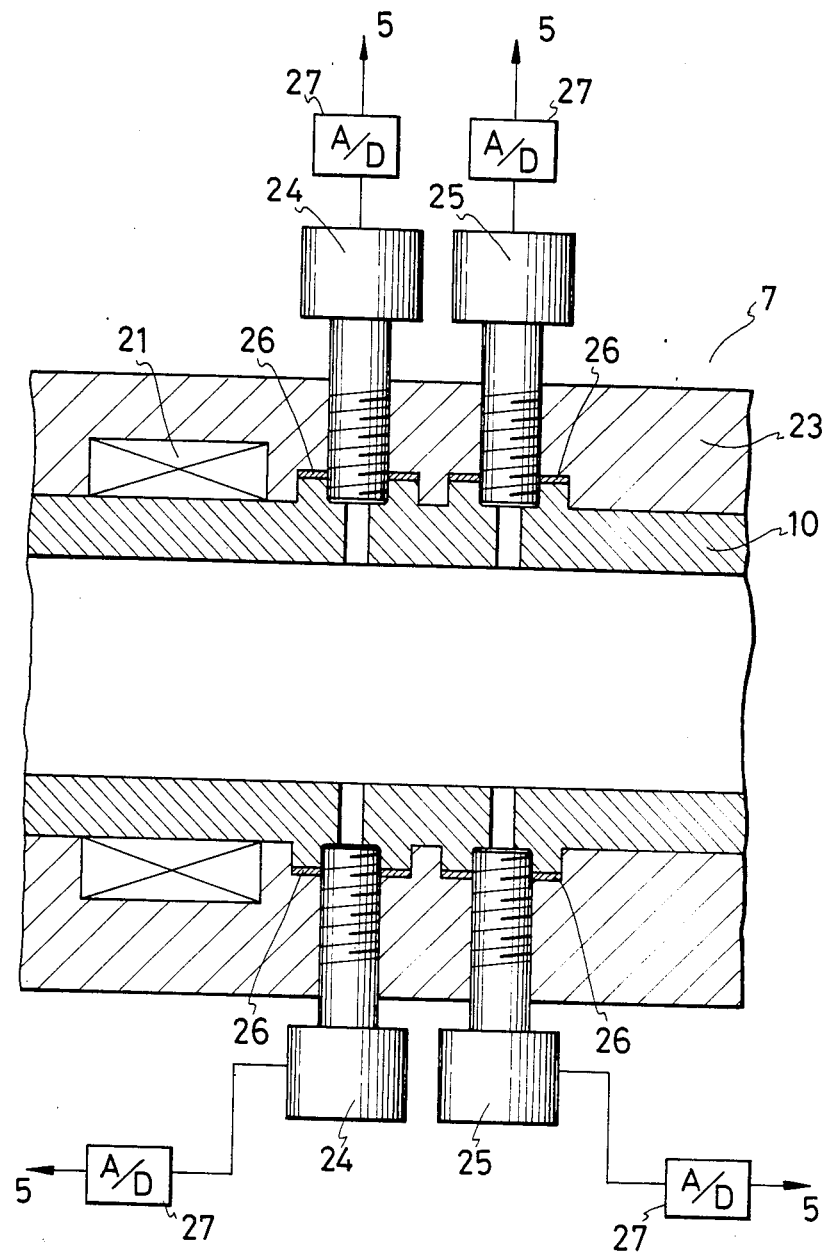
FIG. 2 is a cross-sectional view diagrammatically illustrating a portion of the plasticating barrel in the arrangement of FIG. 1.

In the embodiment illustrated, the plasticating cylinder 10 is also provided at spaced-apart positions along the inner surface thereof in the direction of flow of the material with a plurality of pressure sensors 24 and a plurality of thermo sensors 25 to sense the pressure and the temperature of the material at each of various stages in which it is progressively plasticized and homogenized. As shown in FIG. 2 in an enlarge view of a portion of the plasticating barrel 7, the pressure sensors 24 and thermo sensors 25 may each be bolted through the shroud 23 into the cylinder 10 and secured by a lock nut 26. Each sensor has an A/D (analog to digital) converter 27 connected therewith to transform a pressure or heat magnitude sensed in an electrical signal into a corresponding digital signal, which is fed to the control unit 5 for comparison with a respective reference or threshold value or range preset therein with respect to each of the preset locations in the cylinder 10 and in conjunction with a particular amount and kind of the material being extruded. Thus, the control unit 5 has in advance memorized therein an ideal temperature and an ideal pressure profile (versus time) empirically obtained at each of the locations where the sensors 24, 25 are located, and for a particular kind of the material and for a time period in which a particular amount of the material is plasticized in and extruded out of the cylinder 10. From the measured values at the sensors 24, 25, the controller 5 computes an actual profile for each of the pressure and the temperature and compares it with the corresponding ideal profile and, if any deviation is detected between them, issue control signals which are adequate to control the heating power supply 22 and/or the motor 14 in the sense to eliminate such deviation. The power supply 22 may be controlled to selectively increase and/or decrease the output power of one or more of the parallel outputs which are respectively applied to the induction coils 21 so that a preset ideal temperature may be recovered at each or any relevant stage. The motor 14 may be controlled to increase or decrease the rate of rotation of the screwed ram 12 so that an ideal dynamic pressure of the material in the cylinder 10 may be maintained which is necessary to allow the different stages therein to have their respective ideal pressure profiles as well as their respective ideal temperature profiles. In addition to or as an alternative of such measurements and controls, the torque encountered by the screwed ram 12 may be detected by the encoder 15 responsive to a change in the rotation of the ram 12.

The molding stage 4 employs a mold arrangement desructably made up of an upper mold 28 and a lower mold 29 which when brought together forms a mold cavity 30 therebetween to be injected and packed with an amount of the melt flowing from the plasticator stage 2 as described. The lower mold 29 is detachably mounted, via a spacer block 31 with a central, indented bore, securely on a bored support block 32 which is in turn securely seated via a thermo-insulating plate 33 and a mounting plate 34 on a base table 35. The spacer block 31 is centrally fitted with a bushing or block 36 having a central melt passage 36a with a valve 37 communicating an inlet melt passage 32a in the support block 32 with a sprue 29a for the mold cavity 30 in the lower mold 29. The upper mold 28 is detachably supported and securely carried by a platen 38 which is guided for vertical movement on parallel posts 39 standing upright on the base table 35. The platen 38 is supported by a vertical ram 40 which is axially movable by means of a motor drive unit 41 to move up and down the upper mold 2. The motor unit 41 is driven in response to a command signal from the controller 5 to move down the upper mold 28, bring it into engagement with the lower mold 29 to form the mold cavity 30 and keep the molds clamped while the cavity is being injected and packed with the melt introduced under pressure through the flow passages 32a, 36a and 29a. An encoder 42 is associated with a drive shaft of the motor unit 41 to sense a change in the clamping pressure exerted by the two molds against the melt pressure in the cavity 30. The control unit 5 responds to a signal from the encoder 42 and furnishes the motor unit 41 with a control signal to modify the rate of rotation thereof so as to maintain the clamping pressure acting on the molds 28 and 29 substantially constant until the melt has been molded and frozen off. Both upper and lower molds here include heating coils 43 and 44, and coolant conduits 45 and 46. The coils 43 and 44 are energized by a heating power supply 47 under command of the controller 5 so that the molds are held warm at a given temperature (e.g. 50° C.) or with a given temperature profile while the cavity 30 is being packed. The conduits 45 and 46 are supplied with a coolant fluid under command of the controller 5 to allow the melt material packed in the cavity 30 to freeze off with a given temperature profile. When and each time a given molding cycle is finished, the controller 5 commands the motor drive unit 41 to remove the upper mold 28 upwards to a given stand by position, and then actuates an ejector (not shown) to discharge the molded product out of the lower mold 29 in a known manner.

A major problem in injection molding is to obtain molded products free from microvoids, microcracks and dimensional inaccuracies during repetitive molding cycles and to maximize the rate yield of such satisfactory products. A dimensional inaccuracy is caused by a surface sinking or reduction in volume of the packed material while freezing off, and may be avoidable by permitting the mold to be controlledly melt-replenished when cooling is initiated. Microvoiding and internal cracking tend to develop due to any excessive stresses created in the material while being pressure molded and cooled. It has been found that all these defects tend to develop due to a lack of proper control and arrangement in the conventional injection molding system in conditioning the melt and pressure-introducing it into the mold for proper solidification therein.

The present invention starts contemplating a separation of the functions assumed by the conventional injection barrel stage into two stages so that there functions operate generally independent of each other. Thus, an intermediate melt conditioning stage 3 is provided between the barrel stage 2 and the molding stage 4, and the barrel stage 2 is designed and arranged to assume the plastification of the material for a further, controlled conditioning in the stage 3 prior to transfer into the molding stage 4.

The stage 3 is shown to comprise a hollow housing or tubing 47 and a ram member disposed for sliding movement therein to define a chamber 48 of variable volume. The ram member is shown as a piston 49 but may alternatively be a plunger. As shown, the piston 49 is supported by a piston rod 50, which slidably passes through a partition 51 separating the chamber 48 from a further chamber 52 and which is connected to a further piston 53 disposed in the latter. The chamber 48 is defined by a cylinder 54 of a rigid and electrically conductive material, say, steel, the cylinder being surrounded by an insulating shroud 55 framing the hollow housing 47. The tubing 47 is formed at its forward end with an outlet port or nozzle 56 continuous with the runner or fluid passage 32a in the molding stage 4. The tubing 47 is also formed, close to the forward end, an inlet port 57 communicating via the valve 20 with the fluid outlet 19 leading from the plasticating barrel 7, thus to accept the plasticized material extruded out of the cylinder 12 in the barrel 7.

The tubing 47 is also formed with a pair of ports 58 and 59 close to its rear end and immediately behind the partition 51, respectively, which ports communicate via a two-position four-way valve system 60 with a hydraulic or pneumatic fluid source and return (not shown). The valve system 60 is controlled by command signals furnished from the controller 5. When the valve 60 is placed at one position, a pressure fluid is introduced through the port 58 into one compartment on the left-hand side of the piston 53 in the chamber 52 with the fluid in the other compartment on the right-hand side of the same piston being withdrawn through the port 59 to move the piston rod 50 in the direction of right, thereby reducing the volume of the chamber 48 defined by the piston 49 in the cylinder 54. When the valve 60 is placed at the other position, the pressure fluid is introduced through the port 59 into that other compartment with the fluid in that one compartment ment being withdrawn through the port 58 to move the piston rod 50 in the direction left, thereby enlarging the volume of the chamber 48.

Figure 3:
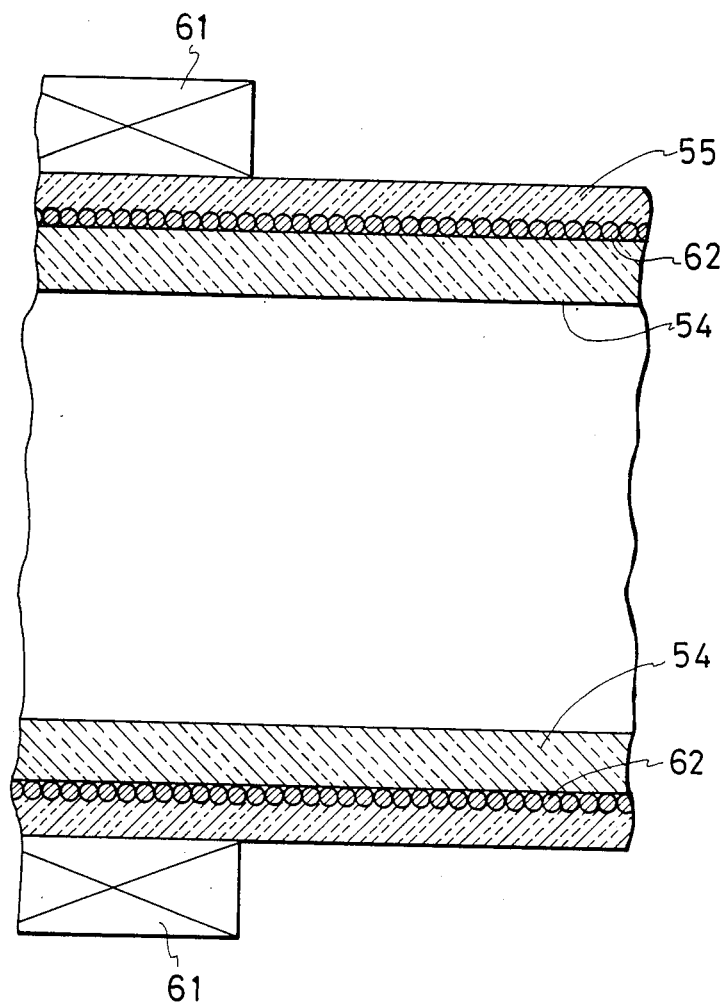
FIG. 3 is a cross-sectional view diagrammatically illustrating a modification of the housing structure which is preferably used to constitute the packing means shown in FIG. 4.

Induction coils 61, e.g. three in number, surrounding the conductive cylinder 54 symetrically about its axis are embedded in the insulating shroud 55 and are energized by an inverter-type power supply 62 under command of the controller 5. As mentioned previously, it is desirable that a conductive cylinder in an induction heating system be thin enough to carry the eddy current with greater uniformity across its thickness and thus to enhance the heating efficiency. This may, however, impair the mechanical durability of the housing structure subjected to an elevated internal pressure. FIG. 3 shows an improved housing structure in which a thin steel cylinder 54 has wound around it a wire or strand 62 of a high-strength, electrically resistant material such as carbon or silicon-carbide fibers in a thermo-insulating shroud 55 composed of a porous ceramic. This structure makes the thin cylinder 54 extremely rigid and stable against the high melt pressure herein and also permits the material to be heated with much enhanced efficiency and quickly to a given elevated temperature prior to molding, and temperature-controlled at an extremely high response rate. In this arrangement, which can also be employed for the barrel structure in the plasticating stage 2, the induction coils 61 are disposed around the insulating shroud 55.

In operation, the screwed ram 12 in the plasticating stage 2 is rotated by the motor 14 under numerical commands of the controller 5 at a commanded rate of rotation to transfer the material fed from the feeder 6 through the cylinder 10 and extrude it through the nozzle outlet 19 while the induction coils 21 are energized by the inverter power supply 22 under numerical commands from the controller 5 so that the material transferred through the cylinder 10 undergoes a prescribed heating and kneading history for its prescribed ideal plastification. The number of rotation of the motor 14 is also programmed in the controller 5 so that the plasticized material extruded through the outlet nozzle 19 in each extruding cycle is at a prescribed amount. At the end of each cycle, the ram or piston 49 in the packing stage 3 is commanded by the controller 5 to assume a prescribed position such that the volume of the prescribed extrusion amount is not less than the volume of the chamber 48 formed by the positioned piston 49 in the cylinder 54. Thus, for example, the chamber 48 may be filled up with the prescribed extrusion amount. Alternatively, the chamber 48, the outlet port 56 and the runner 32a may be filled up by that prescribed amount. The filled up volume must in turn be equal to each molding volume or a multiple thereof. In each molding step, the piston 49 is advanced in the direction of right in the induction-heated cylinder 54 at a prescribed rate under command of the controller 5 acting on the nozzle system 60. The material in the chamber 48 is heated at a prescribed temperature, e.g. 200° C., higher than the average or maximum temperature in the plasticating barrel 7, under command of the controller 5 acting on the inverter power supply 62. The material thus conditioned into a melt ideal for packing or injection is thus discharged at an ideal rate under command of the controller 5 out of packing chamber 48 into the mold cavity 30. The check valve 20 prevents back flow of the melt in the chamber 48 into the plasticating cylinder 10 prior to the advancement of the piston 49 in the cylinder 54, the valve 37 in the molding stage is opened by a command signal from the controller 5. The piston 49 is advanced by a prescribed amount of displacement programmed in the controller 5, which amount may be equal to the total preset distance of advance until the piston 49 reaches the right-hand end of the chamber 48 in the cylinder 54, or a fraction 1/n of that total distance where the extruded amount is to be divided by n and, molded in n cycles to produce n numbers of molded products. The precise maintenance of the packing and injection cycles, i.e. an increased molding shot control, is thus obtained.

In the embodiment illustrated, the piston 50 is constituted by an amplifier horn having at its base an electromechanical transducer 63 accomodated in the piston member 53, the transducer being energized by a high-frequency power supply (not shown) actuated to generate ultrasonic mechanical vibrations by a command signal from the controller 5. The amplifier horn 50 transmits the generated ultrasonic vibrations via the piston 49 to the material being injection-molded into the cavity 30. It has been found that this arrangement is highly efficient and effective in eliminating the microvoiding, internal cracking and surface sinking in the molded projects.

Figure 4:
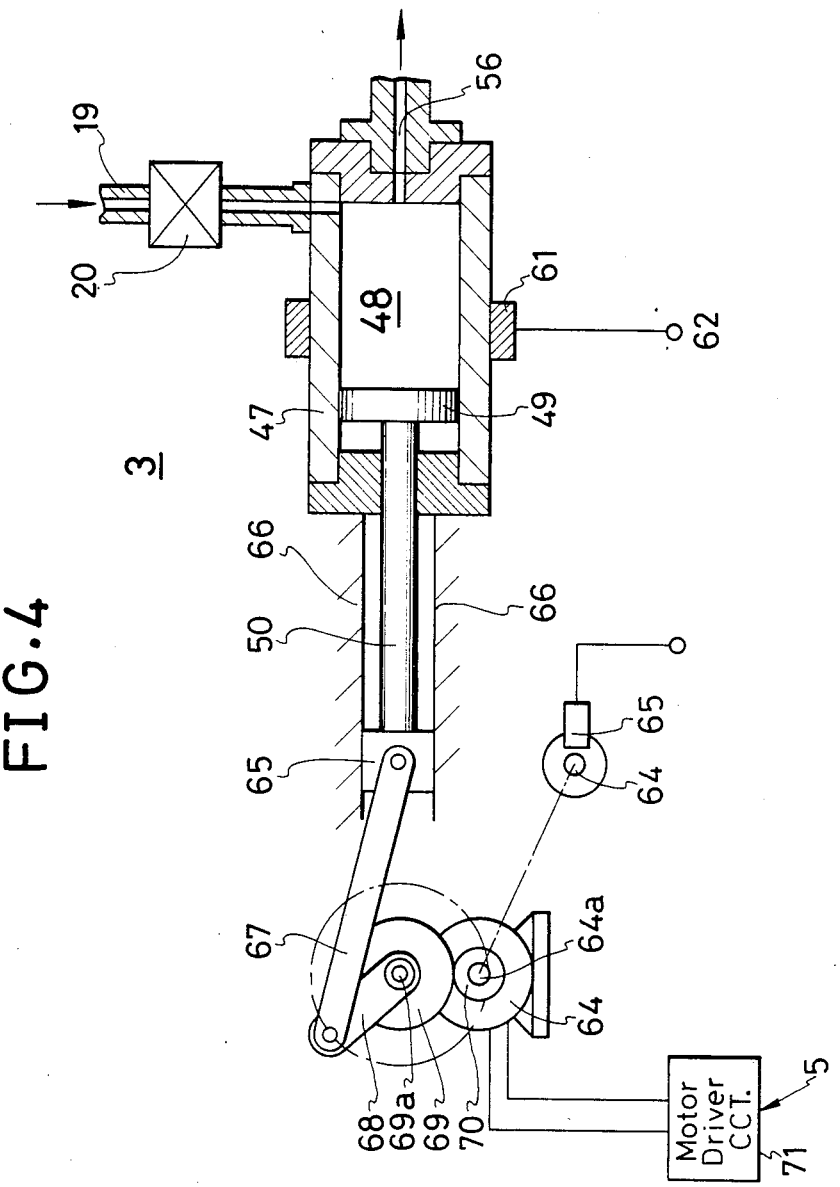
FIG. 4 is a cross-sectional view diagrammatically illustrating a modified form of the drive system which may be used with the packing means of FIG. 1.

FIG. 4 shows a modified embodiment of the packing stage 3 in which the piston 47 is driven by an electric motor 64. Thus, the piston rod 50 supporting at its forward end the piston 47 has its rear end supported by a member 65 which is slidably supported between parallel guide surfaces 66 outside of the housing 47 so as to be movable to move the cylinder 47 when the motor 64 is driven. The member has a rod 67 secured thereto which is connected to a crank 68 secured to the shaft 69a of a geared rotary member 69 in mesh with a geared wheel 70 which in turn is secured to the output shaft 64a of the motor 64. Here, the shaft 69a is arranged to lie on an extension of the axis of the piston rod 50. As the motor 64 is rotated, the piston 49 is reciprocated in the cylinder housing 47 with a stroke determined by the length of the crank 68. The motor 64 is energized by a driver circuit 71 under command of the controller 5 to reciprocate the piston 49 at a prescribed rate. In this manner, drastic increases in shot precision is achieved.

The check valve 20 allows the barrel 7 to extrude the material to the packing chamber 48 at each stroke (i.e. a prescribed angle of rotation of the screwed ram 12) and seals the barrel 7 until the ram 49 in the packing unit 3 completes its preset stroke. Thus, the operation of the packing ram 49 can be completely isolated from the operation of the barrel 7 to increase injection pressure and prevent melt backflow. Thus, the high packing pressure comes from the smaller packing unit 3 than the plasticating barrel 7, thus also increasing efficiency in power consumption. The thermal control of the packing unit 3 increases the machine's ability to mold heat-sensitive material. Both temperature and pressure in the barrel can be significantly lowered by an increase in pressure and/or temperature in the packing chamber 48, which can readily be achieved, to increase the melt flowability in the mold cavity 30.

What is claimed is:

1. An injection molding machine for molding a plastic material, comprising:
   barrel means for melting the plastic material and for extruding a melt of the plastic material, said barrel means having two ends;
   a heated cylinder within said barrel means for containing the plastic material, said cylinder having a screwed ram rotationally disposed therein;
   a feeder for dispensing the plastic material into the heated cylinder, said feeder mounted on one end of said barrel means;
   an outlet nozzle for extruding the plastic melt from said heated cylinder, said outlet nozzle located at the other end of said barrel means;
   packing means for accepting an amount of said extruded plastic melt from said outlet nozzle, said packing means having a heated tubular housing;
   a sliding member disposed in said tubular housing for sliding displacement, said sliding member and said tubular housing forming a packing chamber for accepting said plastic melt;
   a mold cavity coupled to said packing means;
   drive means associated with said packing means for displacing said sliding member to reduce the volume of said packing chamber for forcing the plastic melt contained in said packing chamber into said molding cavity;
   control means for controlling the rotation rate of said screwed ram, the plastic material dispensing rate of said feeder, and the temperature of said heated cylinder;
   a plurality of pressure sensors disposed along the length of said heated cylinder for sensing pressures along the interior length of the heated cylinder, said pressure sensors being electrically coupled to said control means to supply said control means with signals respecting the pressure profile along the interior length of said heated cylinder;
   a plurality of temperature sensors disposed along the length of the interior of the heated cylinder for sensing temperatures along the interior length of the heated cylinder, said temperature sensors being electrically coupled to said control means to supply said control means with signals respecting the temperature profile along the interior length of said cylinder; and
   said control means being such as to regulate the rotation rate of said screwed ram, the plastic material feed rate of said feeder and the temperature of said heated cylinder in response to said sensed pressure and temperature profiles.

2. The injection molding machine as recited in claim 1 wherein said outlet nozzle has a check valve means for allowing extruded plastic melt to pass out of said heated cylinder to said packing means while not allowing plastic melt to pass in the reverse direction.

3. The injection molding machine as recited in claim 1 wherein said sliding member includes a transducer means for generating ultrasonic mechanical vibrations upon being energized, said ultrasonic mechanical vibrations generated for traveling to the plastic material in the mold cavity.

4. The injection molding machine as recited in claim 3 wherein said transducer means is actuatable by said control means.

5. The injection molding machine as recited in claim 1, wherein said mold cavity is formed between an upper mold and lower a mold, said upper and lower molds having heating coils and cooling conduits such as to be actuated by said control means, said upper mold being movable with respect to said lower mold by a mold drive means actuatable by said control means.

6. The injection molding machine as recited in claim 1 wherein said control means being such as to regulate said drive means and said heated tubular housing to establish a stroke and rate of each displacement of said sliding member and a packing temperature in said heated tubular housing in accordance with the extrusion rate and temperature of said plastic melt exiting said heated cylinder through said outlet nozzle, as set by said control means.

* * * * *